United States Patent [19]

Ghrist

[11] 4,140,304

[45] Feb. 20, 1979

[54] RESILIENT VEHICLE RIDE STRUT

[75] Inventor: Roy W. Ghrist, Eastlake, Ohio

[73] Assignee: Euclid, Inc., Cleveland, Ohio

[21] Appl. No.: 859,308

[22] Filed: Dec. 12, 1977

[51] Int. Cl.² .............................................. F16F 1/52
[52] U.S. Cl. .................................. 267/63 R; 213/45;
267/153; 280/716
[58] Field of Search .................. 267/4, 60, 63 R, 138,
267/141, 153, 166; 213/40 R, 45, 47, 48;
280/716

[56] References Cited

U.S. PATENT DOCUMENTS

| | | | |
|---|---|---|---|
| 2,683,044 | 7/1954 | Seddon | 267/63 R X |
| 2,801,010 | 7/1957 | Willison | 213/45 |
| 2,973,102 | 2/1961 | Nystrom | 213/45 X |
| 3,178,035 | 4/1965 | Peterson | 267/138 X |

*Primary Examiner*—George E. A. Halvosa
*Attorney, Agent, or Firm*—Watts, Hoffmann, Fisher & Heinke Co.

[57] ABSTRACT

A vehicle ride strut includes first and second tubular housing members having open ends telescoped together. A compression spring is compressed by telescopic movement of the housing members relatively toward each other, and a snubber resiliently resists movement of the housing members in a direction away from each other during ride strut extension.

15 Claims, 3 Drawing Figures

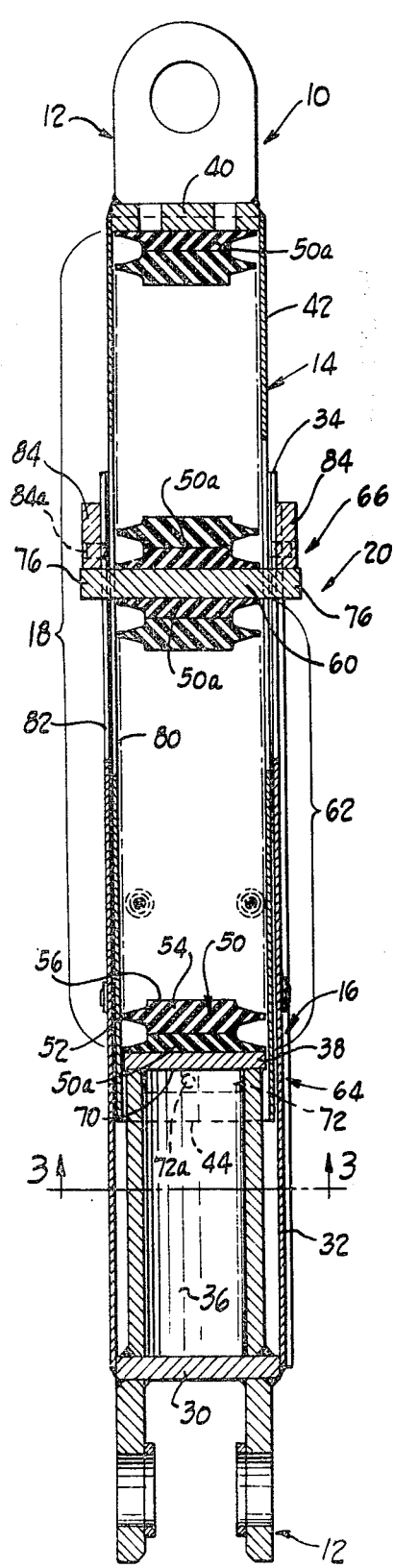
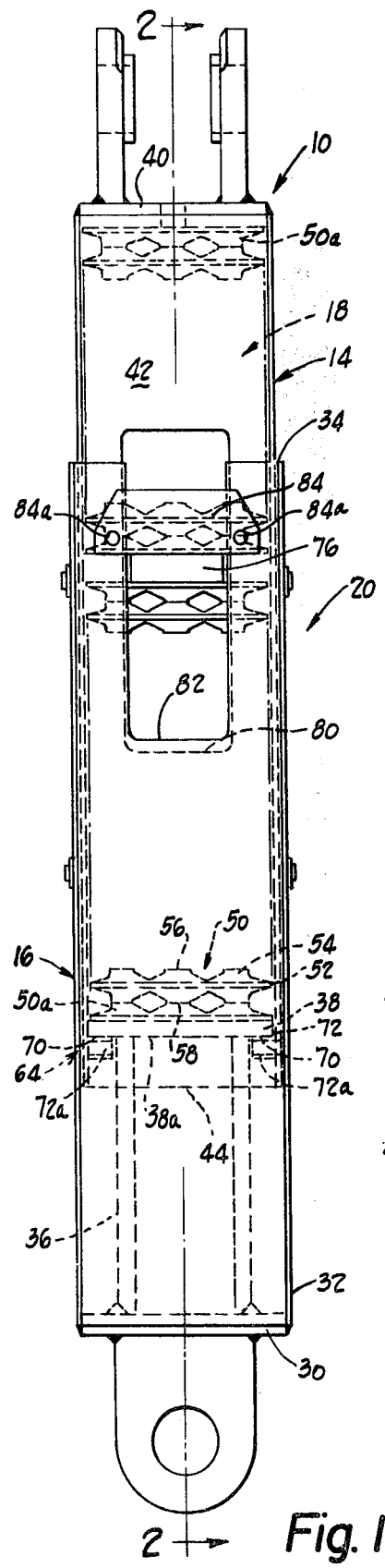
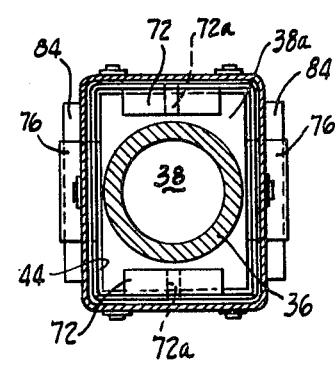
Fig. 1
Fig. 2
Fig. 3

RESILIENT VEHICLE RIDE STRUT

BACKGROUND OF THE INVENTION

1. Field of the Invention

The present invention relates to vehicle ride struts and more particularly to ride struts for load carrying vehicles operable over rough terrain.

2. The Prior Art

Vehicle ride struts are generally positioned between the vehicle frame and an axle housing, or equivalent structure, to act as a suspension spring enabling relative motion between the frame and vehicle wheels when rough terrain is encountered.

The ride struts have frequently been formed by telescoping tubular housings having a compression spring confined between them. The closed ends of the housings are connected to the respective frame and axle housing so that as the axle tends to move toward the frame the spring is further compressed. The compression springs are initially compressed by the sprung vehicle weight and payload.

One problem in some prior art ride struts resulted from a vehicle wheel encountering a depression, chuck hole or the like of sufficient depth that the ride strut was fully extended with the wheel and axle suspended from the frame principally by the ride strut. The ride strut housings tended to be hyperextended and damaged in such circumstances because of the abruptly applied load of the wheel and axle and the application of ride strut spring forces to the strut housing members.

In order to reduce the possibility of strut damage, ride strut constructions were proposed in which a portion of the ride strut spring was resiliently compressed when the ride strut was extended more than a predetermined amount. The spring compression, in effect, provided for resilient hyperextensions of the struts and tended to ameliorate shock loadings applied to the strut housing members. The prior art proposals employed snubbers formed by spring compressing piston-like members disposed in the ride struts and supported by associated rods extending at least part way through the strut. An example of one such ride strut construction is disclosed by U.S. Pat. No. 3,713,666 issued to Cheers et al.

The Cheers et al. patent discloses a ride strut spring constructed from a stack of stiffly resilient "doughnuts." Each "doughnut" is a spring unit formed by a rubber-like material bonded to an annular supporting plate. Springs constructed in this manner have proved relatively successful because they can provide tolerable spring characteristics under extreme load conditions without necessitating unduly large ride struts.

In ride struts constructed with snubbers the internal rod and associated piston enabled compression of all the spring units under normal vehicle loads and compression of a portion of the spring units when the strut was extended. These types of struts dealt with the hyperextension problems but had some constructional drawbacks. In the first place the use of an internal rod necessitated the use of open centered spring units which, because of their open centers, did not have the spring capacity of an otherwise identical spring unit having spring material along its centerline. The struts therefore tended to be of greater size than they might otherwise have been. Secondly the annular shaped spring units tended to become skewed in the ride struts which resulted in damage to the rod, the ride strut housing members and to the spring units. The rods were carefully constructed to guide the relatively moving spring units but even so, scoring, abrasion, etc., of the ride strut components was not always avoidable. In some proposals additional spring units were employed to avoid metal to metal contact between ride strut components when the ride strut rebounded from a hyperextended position to a normally compressed position. Additionally the construction of these units required a significant number of machined component parts, or parts which were otherwise not easily fabricated, resulting in the ride struts being complicated to manufacture and expensive.

SUMMARY OF THE INVENTION

The present invention provides a new and improved ride strut having a snubber structure for enabling resilient strut extension and constructed of a relatively few simple, inexpensive, and easily assembled components.

A ride strut constructed according to the invention comprises inner and outer tubular ride strut housing members having open ends telescoped together and a snubber arrangement for resiliently resisting telescopic extension of the ride strut. The snubber arrangement is formed by first and second spring engaging members, a snubber spring interposed between the spring engaging members and motion transmitting structure for moving the spring engaging members to compress the snubber spring when the strut is extended. The motion transmitting structure coacts with the first spring engaging member and the inner housing member to permit the inner housing member to move relative to the first spring engaging member when the strut is compressed but when the strut is extended the first spring engaging member is moved with the inner housing member and relative to the outer housing member. The motion transmitting structure prevents the second spring engaging member from moving relative to the outer housing when the strut is extended but permits such relative motion when the strut is compressed. Accordingly the spring engaging members compress the snubber spring between them when the strut extends so that strut extension is resiliently resisted.

In a preferred embodiment of the invention a compression spring is disposed between the ride strut housings for resiliently resisting strut compression. The snubber spring is formed by a portion of the compression spring coacting with the spring engaging members. The second spring engaging member is interposed between sections of the spring and constructed and arranged so that it is movable with respect to both housing members upon compression of the strut. In effect the second spring engaging member "floats" with respect to the housing members except when the strut is extended.

The housing members, spring engaging members and motion transmitting structure are constructed from simple parts. Structural connections between component parts are formed by welds. This significantly reduces the cost and complexity of parts and reduces the difficulty of assembly of the struts.

The ride strut assembly preferably has a rectangular cross-sectional shape and the spring is formed by a plurality of rubber-like spring pads shaped to conform to the interior strut shape. The plates are likewise shaped to conform to the strut interior and are not associated with internal supporting shafts or the like thus simplifying the strut construction and assembly, enhancing the effectiveness of the spring in terms of strut size versus strut spring volume, and reducing wear and abrasion of internal strut parts which would tend to occur in a cylindrical strut.

Other features and advantages of the invention will become apparent from the specification which follows and from the drawing which forms part of the specification.

BRIEF DESCRIPTION OF THE DRAWINGS

FIG. 1 is an elevational view of a vehicle ride strut embodying the present invention;

FIG. 2 is a cross sectional view seen approximately from the plane indicated by the line 2—2 of FIG. 1; and, FIG. 3 is a cross sectional view seen approximately from the plane indicated by the line 3—3 of FIG. 2.

DESCRIPTION OF A PREFERRED EMBODIMENT

A ride strut 10 embodying the present invention is illustrated by FIG. 1 of the drawings. The ride strut 10 is constructed for assembly between the frame and an axle housing of an off-road vehicle, such as a load hauling truck (not illustrated), and is shown as provided with clevises 12 at its opposite ends by which the strut is connected to the vehicle. The ride strut 10 is formed by inner and outer tubular housing members 14, 16 respectively, having their open ends telescoped together, a load bearing compression spring structure 18 disposed within and between the housing members 14, 16 and a strut extension snubber structure, generally designated by the reference character 20, coacting between the housing members 14, 16 for enabling resilient extension of the ride strut when the housing members extend, i.e., move relatively away from each other.

The outer housing member 16 is formed by an end plate 30 and a tubular wall construction 32 which has a generally rectangular cross sectional shape and extends from the end plate to the open end 34 of the housing member. The end plate 30 supports the associated clevis 12 and in the illustrated and preferred embodiment the wall construction 32 and clevis 12 are welded to the end plate. The internal side of the end plate 30 has a cylindrical spacer 36 welded to it so that the spacer projects into the wall structure 32 toward the open end 34 generally along the longitudinal axis of the housing member 16. The projecting annular end face of the spacer 36 carries a spring engaging member 38 seated against it. The plate 38 is effective to transmit compressive forces to the spring structure 18 and is preferably formed by a rectangular plate or piston-like member.

The inner housing member 14 is formed by a generally rectangular end plate 40 having a tubular generally rectangular cross sectional wall structure 42 projecting from the end plate 40 to the inner housing open end 44. The wall structure 42 and the associated clevis 12 are preferably welded to the end plate 40. The spring structure 18 is engaged between the end plate 40 and the member 38 so that movement of the housing members relatively toward each other compresses the spring structure 18. The inner housing member end 44 extends beyond the spring engaging member 38 and about the spacer 36. The wall structure 42 conforms to but is of slightly smaller diametrical extent than the wall structure 32 so that the inner and outer housing members are telescopically slidable with respect to each other without interference.

The spring structure 18 resiliently resists telescoping relative movement of the housing members towards each other under varying vehicle load conditions and when the vehicle encounters rugged terrain. The illustrated and preferred spring structure 18 is formed by a plurality of individual spring units disposed within the housing members in a stack extending between the member 38 and the end plate 40. Each spring unit is formed by a rubber-like pad 50 of any material suitable for use in a ride strut of the character referred to. The pads 50 are of rectangular shape conforming to the shape of the inner housing member and have a rectangular peripheral edge portion 52. The edge portion 52 extends away from a body 54 formed by three parallel sections each having opposed bearing faces 56, 58 engaging adjacent respective spring pads.

Modified spring pads 50a are disposed at the opposite ends of the spring structure for bearing on the end plate 40 and the member 38, respectively. Each pad 50a terminates in a flat surface in the plane of the edge portion 52 and as such engages the end plate 40 or the member 38 across a substantial surface area.

The rectangular cross sectional shapes of the ride strut housings, the spring pads and the member 38 have been found to provide a cooperative guiding relationship between the various components which minimizes misalignments. Prior art ride struts employing cylindrical housings and circularly shaped spring pads have experienced cocking of the spring pads in the housings when the housings have rapidly reciprocated relative to each other in constructions where the pad motion has not been guided. The use of square or rectangular shaped strut components avoids the need for pad motion guide structures.

In the illustrated and preferred embodiment the outer housing wall is provided with grease fittings which enable injection of heavy lubricating grease into the clearance space between the inner and outer housing walls. The grease lubricates the walls to facilitate telescopic motion and its presence seals the clearance space against the entry of dirt and/or sand particles which might otherwise abrade the walls during telescopic relative motion.

The snubber structure 20 resiliently resists extension of the ride strut 10 under vehicle operating conditions in which the axle housing and vehicle frame move relatively away from each other. The snubber structure 20 is preferably formed by the member 38, a second spring engaging member 60 (also formed by a plate or piston member), a snubber spring 62 between the spring engaging members, and lost motion structures 64, 66 for moving the members 38, 60 toward each other to compress the snubber spring when the housing members are moved relatively away from each other during ride strut extension.

The member 60 is loosely received within the housing members 14, 16 and has opposed rectangular spring pad engaging faces which are shaped to conform to the interior shape of the inner housing member. In the preferred embodiment the plate 60 is interleaved between bearing spring pads 50a within the spring pad stack forming the compression spring 18. The member 60 is located between the housing member ends 34, 44 and is capable of "floating" relative to both housing members when the ride strut is compressed.

The snubber spring 62 is formed by that portion of the compression spring 18 disposed between the members 38, 60 (See FIG. 2). The snubber spring 62 is compressed by the members 38, 60 when the housing members 14, 16 move away from each other during ride strut extension. The spring pads 50 forming the snubber spring 62 are also compressed, like the remaining spring pads of the compression spring 18, when the ride strut is compressed.

The motion transmitting structure 64 is effective to enable the inner housing member 14 to move freely relative to the member 38 during ride strut compression while assuring that the member 38 moves with the inner housing member when the ride strut is extended. The structure 64 therefore functions as a lost motion connection and is preferably formed by abutment portions 70 on the face 38a of the member 38 (opposite the snubber spring pads) and coacting abutment portions 72 within the inner housing member end portion 44. The abutment portions 72 are preferably formed by metal blocks welded in place to the inner housing member and projecting inwardly toward, but short of, the spacer 36 (See FIG. 3). When the inner housing member 14 is withdrawn from the outer housing member 16 the abutment portions 70, 72 engage and the member 38 is lifted from the spacer 36 tending to compress the pads of the snubber spring 62.

The motion transmitting structure 66 enables the outer housing member 16 to move freely relative to the member 60 on compression of the ride strut but assures that the member 60 is carried with the outer housing member as the ride strut is extended. Thus, the structure 66 provides a lost motion connection between the member 60 and the outer housing member 16. In the illustrated embodiment of the invention the motion transmitting structure 66 includes abutment portions 76 formed by ear-like projections on the member 60 which extend through aligned slot-like openings 80, 82 in the housing members 14, 16 respectively. The abutment portions 76 engage respective abutment portions 84 on the outer housing member 16. The illustrated abutment portions 84 are formed by metal blocks welded to the outer housing member to define respective ends of the outer housing member slots 82. When the ride strut 10 is extended the abutment portions 76, 84 are engaged to prevent any relative movement between the member 60 and the outer housing member 16. This consequently results in compression of the snubber spring 62 between the members 38, 60 which move with the inner and outer housings when the strut extends.

Assembly of the new ride strut is easily accomplished. In the illustrated embodiment the spring pads 50 and the spring engaging members 38, 60 are assembled within the inner housing member 14. The inner housing member is appropriately fixtured and force is exerted on the member 38 to compress the spring pads 50 a predetermined amount. When the pads have been compressed sufficiently the blocks forming the abutments 72 are fixed in place in the housing member. In the preferred embodiment of the invention dowell pin receiving holes are provided in the blocks and the inner housing member walls. When the spring pads are compressed the pin receiving holes are aligned and dowell pins 72a are inserted to fix the components with respect to each other preparatory to the blocks being welded to the housing wall 42.

The assembled inner housing member is then telescoped into the outer housing member 16 and the housing members are forced together to further compress the spring pads. When the spring pads are compressed a predetermined amount the blocks forming the abutment portions 84 are secured in place to the outer housing wall. In the preferred embodiment the spring engaging member 60 shifts position when the spring pads are compressed. When shifted a predetermined amount, the member 60 enables dowell pins 84a to be placed in aligned holes in the blocks and the wall of the outer housing member. The blocks are subsequently welded in place.

The assembly procedure outlined above provides for a ride strut having a "preload." That is to say, the spring pads are maintained compressed slightly when the strut is not assembled to a vehicle. The assembled ride strut is illustrated in the drawings in its "unstressed" condition with the compression spring 18 preloaded and the motion transmitting structures 64, 66 conditioned to compress the snubber spring 62 should the strut be extended. When the strut 10 is assembled to a vehicle the vehicle weight compresses the strut by telescoping the housing members 14, 16 relatively towards each other and resiliently compressing the spring 18. The spacer 36 provides for movement of the inner housing end 44 relative to the outer housing end plate 30 during strut compression.

Should the vehicle in which the strut 10 is assembled encounter rough terrain where a wheel loses contact with the ground, the strut 10 will extend to its "unstressed" condition (illustrated) without the snubber spring 62 being compressed. Continued extension of the strut from its unstressed condition compresses the snubber spring so that undue strut extension is resisted by the snubber spring.

The strut 10 is constructed so that the compression spring pads do not permit the inner housing member end 44 to engage the outer housing end plate under any operative condition of the strut. That is to say, the limit of spring pad compression is reached before the inner and outer housing members contact each other. For the same reason the member 60 does not engage the end of the inner housing member slot 80 during any compressive condition of the strut. This feature of the construction avoids destructive buckling of the inner housing member which might otherwise occur if the inner housing member "bottomed out" on the outer housing member, or on the member 60. Conversely this feature permits the usage of relatively light, thin walled housing members since compression strength is not required.

While a single embodiment of the invention has been illustrated and described in detail the invention is not to be considered limited to the precise construction shown. Various modifications, adaptations and uses of the invention may become apparent to those skilled in the art to which the invention relates and the intention is to cover all such modifications adaptions and uses which come within the spirit or scope of the appended claims.

What is claimed is:
1. A vehicle ride strut comprising:
 (a) first and second tubular housing members having open ends telescoped together, said first housing member extending within said second housing member;
 (b) spring means disposed between said housing members and substantially within said first housing member, said spring means compressed by telescoping movement of said housing members toward each other; and,
 (c) snubber means disposed between said housing members for resiliently resisting relative motion of said housing members in a direction away from each other when said strut is extended, said snubber means comprising:

(i) a first spring engaging member disposed within said first housing member in the vicinity of the open end thereof and engaging said spring means, said first spring engaging member defining an abutment portion engageable with said first housing member to prevent relative movement between said first spring engaging member and said first housing member when said housing members are moved relatively away from each other, said first housing member movable relative to said first spring engaging member when said first and second housing members telescope toward each other; and (ii) a second spring engaging member disposed within said first housing member, said second spring engaging member spaced toward the open end of said second housing member from said first spring engaging member with at least a portion of said spring means interposed between said spring engaging members, said second spring engaging member defining an abutment portion engageable with said second housing member when said housing members are moved relatively away from each other, said second spring engaging member movable relative to both said first and second housing members when said housing members telescope toward each other;

(iii) said first and second spring engaging members moved by said respective housing members to compress the interposed spring means portion when said housing members are moved relatively away from each other beyond a predetermined relative position.

2. The vehicle ride strut claimed in claim 1 wherein said second spring engaging member is disposed between opposite ends of said spring means.

3. The vehicle ride strut claimed in claim 2 wherein said spring means comprises a series of individual spring units each formed at least in part of a rubber-like material, said second spring engaging member interleaved between spring units and defining opposed spring engaging faces which bear on the engaged spring units.

4. The ride strut claimed in claim 1 wherein said abutment portion of said second spring engaging member is defined by at least one peripheral projection extending through an opening in said first housing member.

5. The ride strut claimed in claim 4 further including an abutment element connected to said second housing member and engageable with said second spring engaging member projection.

6. The ride strut claimed in claim 1 wherein said housing members define tubular coextending wall portions disposed about said second spring engaging member, said wall portions defining openings aligned with each other and with said second spring engaging member, said abutment portion of said second spring engaging member projecting through said openings and engageable with the second housing member when said housing members are moved away from each other.

7. The ride strut claimed in claim 6 further including an abutment element fixed to said second housing member for engagement with said abutment portion of said second spring engaging member.

8. A vehicle ride strut comprising:

(a) first and second tubular housing members having open ends telescoped together, said first housing member disposed substantially within the second housing member;

(b) a plurality of spring units disposed in said housing members, said spring units compressed by telescopic movement of said housing members relatively toward each other; and (c) snubber means for resiliently resisting movement of said housing members in a direction away from each other during a predetermined amount of ride strut extension, said snubber means comprising:

(i) first and second spring engaging members disposed within said housing members, said first spring engaging member located in the vicinity of the open end of said first housing member and said second spring engaging member spaced toward the opposite end of said first housing member from said first spring engaging member;

(ii) some of said spring units interposed between said first and second spring engaging members, and the remaining spring units interposed between said second spring engaging member and said opposite end of said first housing member;

(iii) first motion transmitting structure for preventing relative motion between said first spring engaging member and said first housing member during said predetermined extension of said ride strut, and (iv) second motion transmitting structure for preventing relative motion between said second spring engaging member and second housing member during said predetermined extension of said ride strut;

(v) said first and second motion transmitting structures effective to move said first and second spring engaging members toward each other to compress said interposed spring units during said predetermined extension of said ride strut;

(d) said first spring engaging member supported against movement relative to said second housing member during telescopic movement of said housing members relatively toward each other and said second spring engaging member movable relative to both of said housing members during telescopic movement of said housing members relatively toward each other.

9. The ride strut claimed in claim 8 further including a spacer disposed between said first spring engaging member and a closed end of said second housing member, said first spring engaging member urged into seating engagement with said spacer by said spring units and disposed within said first housing member.

10. The ride strut claimed in claim 9 further including an abutment on said first housing member, said abutment engageable with an abutment on said first spring engaging member to move said first spring engaging member away from said spacer.

11. The ride strut claimed in claim 8 wherein said second motion transmitting structure comprises an abutment on said second spring engaging member, and an abutment on said second housing member, said first housing member defining an opening through which one of said abutments extends for engagment with said other abutment.

12. A vehicle ride strut comprising:

(a) inner and outer tubular ride strut housing members having open ends telescoped together; and
(b) snubber means for resiliently resisting telescopic extension of said ride strut, said snubber means comprising:
  (i) a first spring engaging member disposed within said inner housing member adjacent its open end;
  (ii) a second spring engaging member disposed within said inner housing member spaced from said open end;
  (iii) snubber spring means interposed between said spring engaging members in said inner housing member;
  (iv) first lost motion structure for preventing relative motion between said first spring engaging member and said inner housing member when said strut is extended; and,
  (v) second lost motion structure preventing relative motion between said second spring engaging member and said outer housing when said strut is extended, said second lost motion structure comprising an abutment portion on said second spring engaging member and an abutment portion on said outer housing member, one of said abutment portions extending through an opening in the inner housing member tubular wall for engagement with the other abutment portion when the ride strut is extended;
  (vi) said lost motion structures effecting movement of said spring engaging members relatively toward each other when said strut is extended to compress said spring means.

13. The ride strut claimed in claim 12 further including compression spring means between said housing members, said compression spring means resiliently resisting telescopic motion of said housing members relatively toward each other.

14. The ride strut claimed in claim 13 wherein said compression spring means is formed by a plurality of rubber-like spring pads disposed in a stack within said housing members, said snubber spring means defined by a plurality of said spring pads disposed between said spring engaging members.

15. The ride strut claimed in claim 14 wherein said housing members define generally rectangular cross sectional shapes, said spring engaging members and said spring units conforming to said housing member shape.

* * * * *